United States Patent [19]
Yates

[11] Patent Number: 5,339,194
[45] Date of Patent: Aug. 16, 1994

[54] POWER ZOOM OPTICAL UNIT WITH ENCODER

[75] Inventor: Robert Yates, Newport Beach, Calif.

[73] Assignee: RAM Optical Instrumentation, Inc., Huntington Beach, Calif.

[21] Appl. No.: 930,364

[22] Filed: Aug. 17, 1992

[51] Int. Cl.$^5$ ............................................. G02B 15/14
[52] U.S. Cl. .................... 359/696; 359/827; 359/382; 359/384; 359/704; 33/559
[58] Field of Search ............... 359/694, 696, 697, 698, 359/699, 700, 379, 380, 382, 383, 384, 822, 825, 826, 827, 829, 830, 704; 33/559, 503, 561

[56] References Cited

U.S. PATENT DOCUMENTS

| | | | |
|---|---|---|---|
| 4,083,057 | 4/1978 | Quinn | 359/698 |
| 4,119,364 | 10/1978 | Takahashi | 359/696 |
| 4,621,906 | 11/1986 | Hashimoto et al. | 359/698 |
| 4,714,328 | 12/1987 | Takahashi | 359/382 |
| 4,884,878 | 12/1989 | Arenal et al. | 359/704 |

FOREIGN PATENT DOCUMENTS 3-361927 11/1991 Japan ..................... 359/696

Primary Examiner—Loha Ben
Attorney, Agent, or Firm—Plante, Strauss & Vanderburgh

[57] ABSTRACT

There is disclosed an optical unit which is primarily intended to provide visual references for measuring machines such as coordinate measuring machines, milling machines, EDM machines, tape and computer controlled drilling machines, etc. The optical unit has a motor driven zoom lens within a lens housing, and an optical coupling for a video camera. The zoom lens assembly of this invention is a modification of that shown in U.S. Pat. No. 4,884,878 to include a stepper drive motor and a rotational position encoder which provides the necessary lens information to determine the power of magnification of the lens at any instant position. The preferred encoder includes a disc mounted on the barrel of the zoom lens which has a plurality of slots about its periphery at equal angular increments, and a photo-optical sensor which counts light pulses and generates a pulsed electrical signal as the disc rotates beside the sensor.

19 Claims, 3 Drawing Sheets

POWER ZOOM OPTICAL UNIT WITH ENCODER

BACKGROUND OF THE INVENTION

1. Field of the Invention

This invention relates to a zoom lens optical unit for high magnification observation of a work piece, and in particular to such an optical unit having a zoom lens drive and magnification encoder which is particularly adapted for use with a video camera.

2. Brief Statement of the Prior Art

Precise measurement and inspection equipment has been disclosed and claimed in various patents, including U.S. Pat. Nos. 4,138,823; 4,084,323; and 4,078,314 which disclose mechanical probes used in a measuring apparatus for determining the dimensions of the work piece. These patented items are particularly intended for use with a coordinate measuring machine.

Some attempts have been made to position closed circuit television cameras on measuring machines and, in particular, attempts have been made to position a standard video camera on coordinate optical measuring machines. A number of difficulties are experienced when attempting to use a video camera in such an application, however, a successful application is shown in U.S. Pat. No. 4,884,878 which discloses a zoom lens with a manual adjustment coupled to a video camera for work piece measurement and inspection.

There is a need to automate the zoom capability of such devices. A number of difficulties are experienced when attempting to provide a motor driven zoom lens in this application. The long focal lengths of high magnification lenses, e.g., microscope lenses, which are used in these probes makes the video camera very sensitive to any instabilities in the video probe mounting, and vibrations induced by a motorized drive cannot be tolerated. Additionally, the magnification power of the lens is not a linear function of its axial extension and conventional digital control and position feedback used with stepping motors is not adequate for indicating the magnification power of the zoom lens during its extension and retraction.

BRIEF STATEMENT OF THE INVENTION

This invention comprises an optical unit having a motor driven zoom lens within a lens housing, and an optical coupling for a video camera. The zoom lens assembly of this invention is a modification of that shown in U.S. Pat. No. 4,884,878 to include a motor drive and a rotational position encoder which provides the necessary lens information to determine the power of magnification of the lens at any instant position.

The preferred encoder includes a disc mounted on the barrel of the zoom lens which has a plurality of slots about its periphery at equal angular increments, and a photo-optical sensor which counts light pulses and generates a pulsed electrical signal as the disc rotates beside the sensor. The pulsed signal is passed to a counter and the output signal of the counter is processed in a desktop computer which also directs the zoom drive motor. In the preferred embodiment, the optical unit is combined with a video camera and the signal from the camera is passed to a video monitor.

The optical unit of the invention is primarily intended to retrofit existing work piece processing machines such as coordinate measuring machines, milling machines, EDM machines, tape and computer controlled drilling machines, which are used for very close tolerance work, e.g., drilling of PC boards and insulating boards used for test beds for automated testing of PC boards.

BRIEF DESCRIPTION OF THE DRAWINGS

The invention will be described with reference to the drawings of which.

DESCRIPTION OF THE PREFERRED EMBODIMENT

Figure 1:
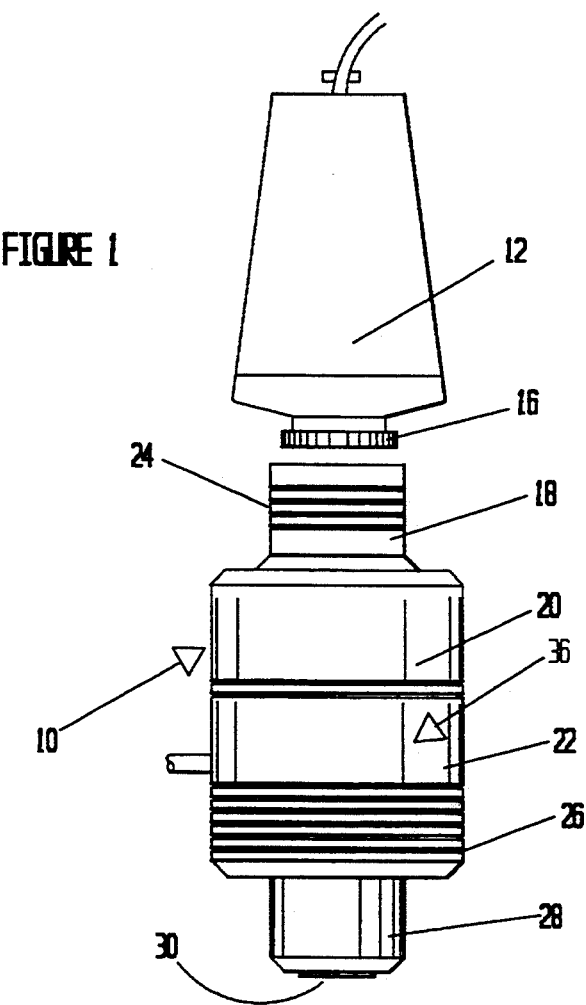
FIG. 1 is an elevational view of the optical unit of the invention with a video camera.

Referring now to FIG. 1, the optical unit 10 of the invention is shown with a conventional video camera within housing 12. The lens 16 of the video camera 12 is directed toward the optical unit 10 of the invention.

The optical unit 10 is formed with an upper body section 18, a center body section 20, and a lower body section 22, which together form an assembled optical housing 36. The body sections of the optical unit 10 are cylindrical with annular grooves 24 and 26. The zoom lens 28 is received within the lower body section 22, which also supports an objective lens adapter 30 at its lower end which receives a threaded sleeve 32 that carries an optically transparent closure member, preferably a magnification lens.

An umbilical cord 34 extends into the housing 36 and this cord includes electrical leads which extend to a stepper motor, described hereinafter, which is received in the center body section 20 and electrical leads which extend to an encoder sensor, also described hereinafter, which is received within the lower body section 22.

Figure 2:
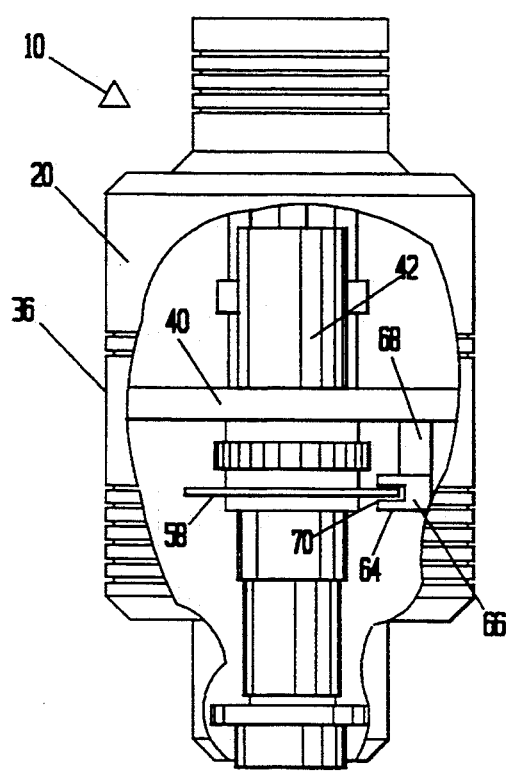
FIG. 2 is a cut-away view of the front of the optical measurement unit of the invention.
Figure 3:
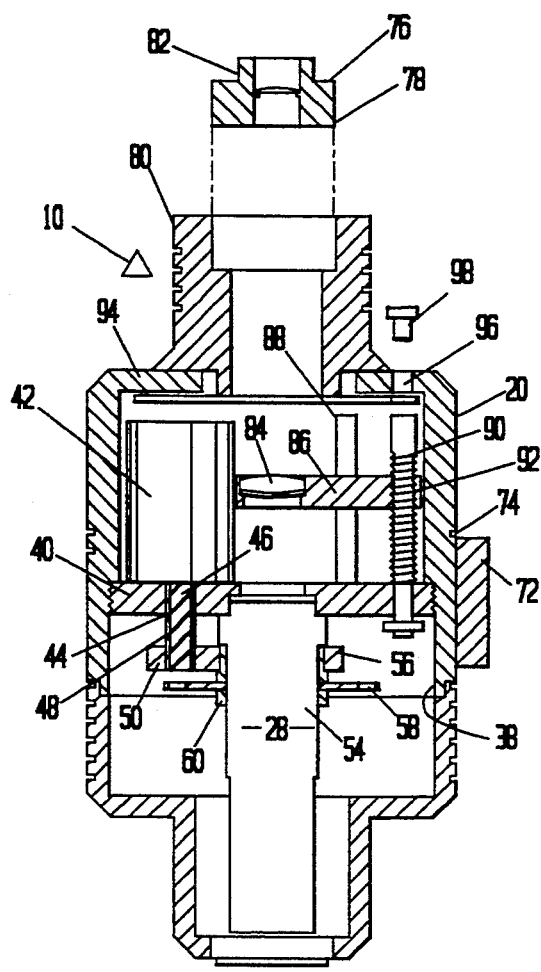
FIG. 3 is a sectional side view along the line 3—3' of FIG. 2 with the stepper drive motor unsectioned.

Referring now to FIGS. 2 and 3, the stepper drive motor and encoder of the invention will be described. In FIG. 2, a cut-away view of the front of the optical unit is shown with a cut out in the optical housing 36. In FIG. 3, the optical unit 10 of the invention is illustrated in a sectional side view, with the internal stepper drive motor and zoom lens assembly being unsectioned for simplicity of illustration.

The center body section 20 has a counterbore 38 which is machined to receive a mounting plate 40. The mounting plate 40 supports the stepper drive motor 42 and has a laterally located through bore 44 which receives the drive shaft 46 of the stepper drive motor 42 in a cylindrical shaft adapter 48, which distally bears a pinion gear 50. A drive hub 52 surrounds the barrel 54 of the zoom lens 28 and supports a drive gear 56 which is meshed with the pinion gear 50. The zoom lens 28 is a conventional zoom magnification lens.

Figure 4:
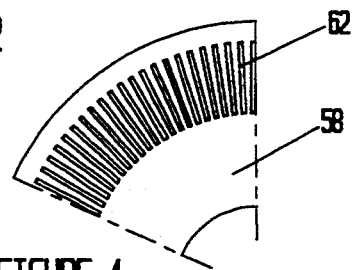
FIG. 4 is an enlarged view of a small section of the encoder disc.

An encoder position registering means in the form of an encoder disc 58 is received on the drive hub 52, and the assembly is secured with a lock nut 60. The encoder disc 58 has a plurality of peripherally disposed through slots 62, which are at a predetermined, equal angular spacing, e.g., 0.3 degrees. The slots 62 are best shown in FIG. 4, which is an enlarged view of a small section of the encoder disc. An encoder sensing means, in the form of a photo optical unit 64 is mounted in a sensor housing 66 which is supported at a lateral location from the underside of the mounting plate 40 by a post 68. The sensor housing 66 has a slot 70 which receives the edge of the encoder disc 58, with a light source and a photo receptive element (not shown) positioned on opposite sides of the slot 70. The circular array of through slots 62, which are adjacent the edge of the encoding disc, are positioned in the slot 70 of the sensor housing 66, between the light source and the photo receptive element.

A mounting bracket 72 is secured to an external side 74 of the center body section, and preferably has interlocking means such as a dovetail, to permit its removable attachment to a support arm to permit mounting the optical unit 10 in a measurement and inspection device.

The upper body section 18 receives an expander lens subassembly which includes a lens housing 76 which is received in an enlarged counterbore 78 in the upper end 80 of the upper body section 18. The lens housing 76 has a threaded upper end 82 which permits direct attachment to the video camera objective lens housing.

A long focal length lens 84 is supported within the center body section 20 on a lens mount plate 86 which is supported by lateral posts 88 and 90 that extend from the mounting plate 40. Lateral post 90 is rotationally mounted on the plate 40 and has external threads which are received in an internally threaded thorough bore 92 in the lens mount plate 86. The annular shoulder 94 of the center housing section 20 has a through aperture 96 in alignment with the lateral post 90 for access thereto and is closed with a removable cap 98. The lateral post 90 thus serves as a lead screw for vertical positioning of the lens mount plate 86, and its focusing lens 84. Lateral post 88 serves as a guide to maintain axial alignment of the lens 84 and lens mount plate 86.

Figure 5:
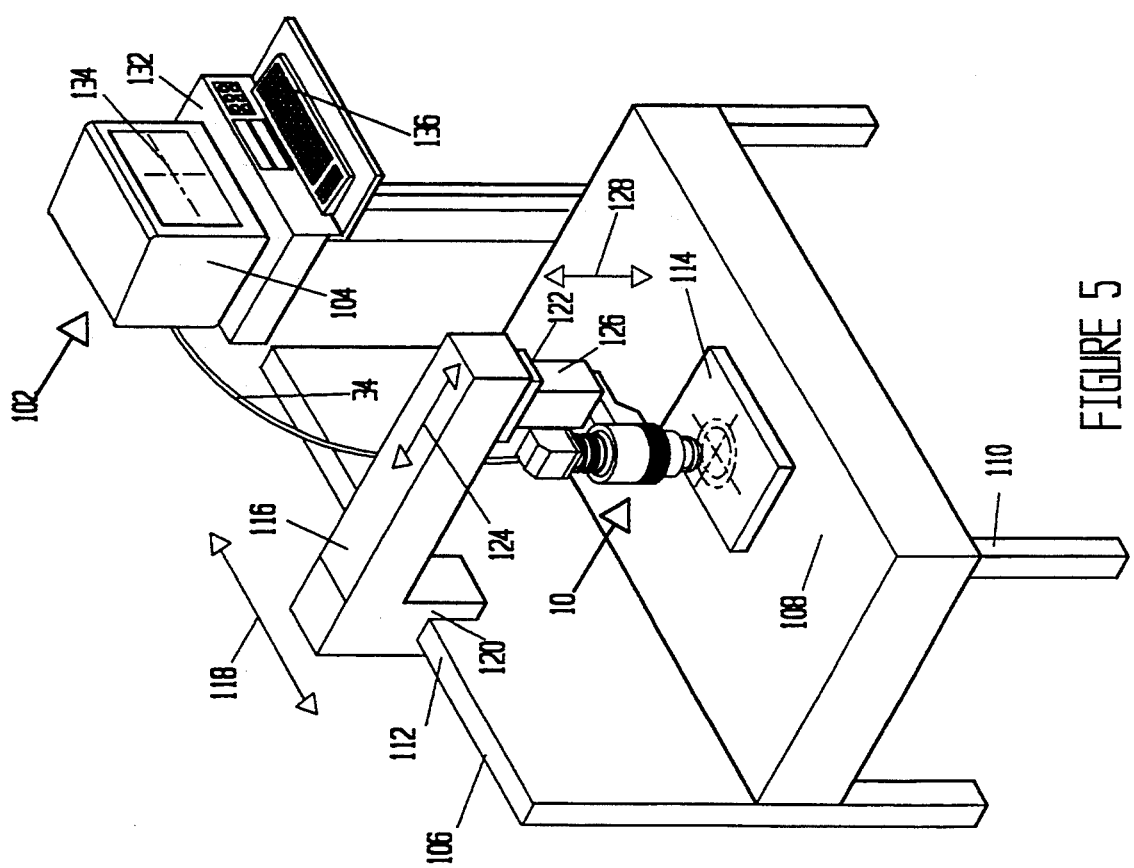
FIG. 5 illustrates an application of the optical unit with a computer workstation installed on a coordinate measuring machine.

Referring now to FIG. 5, the invention is shown in combination with a computer workstation 102 and a video monitor 104 on a conventional coordinate measurement and machine 106. There are many possible applications of the invention with measurement apparatus, and this illustration is only intended to show how the invention can be integrated into an otherwise conventional measurement apparatus.

The coordinate measurement machine 106 has a work table 108 supported on corner legs 110 and has a lateral track 112 which extends coextensively with the lateral span of the work table 108. The work piece 114 is placed upon the top surface of work table 108. Mounted on track 112 is a movable arm 116 which can be driven by a drive motor and gear train (not shown) which are enclosed within the arm 116. The arm 116 is thereby moveable along the direction indicated by the double arrowhead line 118. The arm 116 has an upright standard 120 and projects, orthogonally, to the track 112. Arm 116 also supports a track, (not shown) on which is slidably mounted the measuring carriage 122. The carriage 122 is mounted for sliding movement along the direction indicated by double arrowhead line 124 and, for this purpose, a suitable motor drive or actuator mechanism (not shown) is included in the assembly. Carriage 122 has a vertical beam 126 which is mounted for vertical movement, as shown by the double arrowhead line 128. The carriage 122 contains a suitable drive means such as an electrical or hydraulic drive motor (not shown) for raising and lowering vertical beam 126.

The optical unit 10 of the invention is mounted to the vertical beam 126. The mounting bracket 72 (see FIG. 3) is received in a support arm 130 which is provided in the end of beam 126. The video camera 13 (see FIG. 5) is supported in the assembly with its umbilical cord 34 extending to a remote television monitor 104. In this illustration, the protective housing 12 (see FIG. 1) is not included. This housing 12 is removable and, can optionally be omitted in any application, as desired. The monitor 104 can display a cross-hair 134 which is electronically generated, and the position of this cross-hair can be precisely located in the center of the monitor.

The operation of the video probe is controlled at the keyboard 136 of the computer workstation 102. The operator selects a zoom function from the menu of the operating software for the probe, and the computer 132 generates a pulsed output signal which is sent to the stepper drive motor 42 of the optical unit 10. The stepper drive motor responds by extending or retracting the zoom lens, and the movement of the zoom lens is measured by the optical sensor 64 of the encoder. The pulsed signal generated by the encoder sensor 64 is passed to the computer where the pulses are counted and the summed pulse value is compared to a calibrated standard function for the optical zoom lens. The magnification of the optical unit 10 is calibrated by extending the magnification lens to full extension (magnification) and observing an object of known dimensions. The optical unit 10 generates a video image formed of pixels and the number of pixels are counted by the computer 132. The total pixel value is corrected by the known magnification ratio at full extension to obtain the base line for future calculations.

Thereafter, the magnification at any degree of rotation of the zoom lens barrel will be automatically computed by the microprocessor, following a mathematical third order function which is characteristic of the specific zoom lens used in the optical unit.

The invention has been described with reference to the illustrated and presently preferred embodiment. It is not intended that the invention be unduly limited by this disclosure of this presently preferred and illustrated embodiment. Instead, it is intended that the invention be defined by the means, and their obvious equivalents, set forth in the following claims.

What is claimed is:

1. In an optical unit for use with an optics receiving and processing unit which unit comprises an assembly of an optical zoom lens mounted within a zoom lens housing and having a rotatable barrel for adjustment of its magnification power, the improvement which comprises;

a. a zoom lens drive motor with an output drive shaft mounted in said assembly and including gear means rotationally interconnecting the drive shaft of said drive motor to said rotatable barrel of said zoom lens; and a rotational position encoder also mounted in said assembly, including:

b. position registering means comprising an array of equally spaced registering elements carried on said rotatable barre; and c. a position sensor fixedly secured in said assembly at a location to sense the rotational displacement of said position registering means.

2. The optical unit of claim 1 wherein said position registering means comprises a circular disc.

3. The optical unit of claim 2 wherein said disc has said elements arranged as plurality of slots located adjacent the periphery of said disc at equal angular incremental spacings.

4. The optical unit of claim 3 wherein said position encoder comprises a photo-optical unit.

5. The optical unit of claim 2 wherein said registering elements are carried on said barrel at equal angular increments.

6. The optical unit of claim 1 wherein said drive motor and gear means are contained within said housing.

7. The optical unit of claim 1 wherein said rotational position encoder is contained within said housing.

8. The optical unit of claim 1 wherein said zoom lens is entirely contained within said zoom lens housing.

9. In an optical receiving and processing unit for use with a coordinate measuring machine, which unit includes a video camera, a coupling housing containing a coupling lens assembly, within said coupling housing, and a magnification zoom lens with a rotatable barrel within a zoom lens housing which is supported on said coupling housing opposite said video camera, the improvement comprising:
 a. a zoom lens drive motor with an output drive shaft mounted in said assembly and including gear means rotationally interconnecting the drive shaft of said drive motor to said rotatable barrel of said zoom lens; and
 a rotational position encoder also mounted in said assembly, including:
 b. position registering means comprising an array of equally spaced registering elements carried on said rotatable barrel; and
 c. a position sensor fixedly secured in said assembly at a location to sense the rotational displacement of said position registering means.

10. The optical receiving and processing unit of claim 9 wherein said position registering means comprises a circular disc.

11. The optical receiving and processing unit of claim 10 wherein said disc has said elements arranged as a plurality of slots located adjacent the periphery of said disc at equal angular incremental springs.

12. The optical receiving and processing unit of claim 9 wherein said position encoder comprises a photo-optical unit.

13. The optical receiving and processing unit of claim 9 wherein said drive motor and gear means are contained within said housing.

14. The optical receiving and processing unit of claim 9 wherein said rotational position encoder is contained within said housing.

15. The optical receiving and processing unit of claim 9 wherein said zoom lens is entirely contained within said zoom lens housing.

16. The optical unit of claim 9 wherein said registering elements are carried on said barrel at equal angular increments.

17. In an optical unit for use with an optics receiving and processing unit which unit comprises an assembly of an optical zoom lens mounted within a zoom lens housing and having a moveable barrel for adjustment of is magnification power in response to movement of said barrel, the improvement which comprises;
 a. a zoom lens drive motor with an output drive shaft mounted in said assembly and including gear means interconnecting the drive shaft of said drive motor to said moveable barrel of said zoom lens whereby the magnification of said lens id changed upon movement of said barrel; and
 b. a position encoder also mounted in said assembly, including:
  (1) position registering means comprising an array of registering elements carried on said barrel at spaced-apart locations corresponding to known magnification powers of said lens; and
  (2) a position sensor fixedly secured in said assembly at a location to sense the displacement of said position registering elements and thereby provide information on the magnification of said lens.

18. The optical unit of claim 17 wherein said position registering means comprises a circular disc carried on said barrel.

19. The optical unit of claim 17 wherein said position encoder comprises a photo-optical unit.

* * * * *

UNITED STATES PATENT AND TRADEMARK OFFICE
CERTIFICATE OF CORRECTION

PATENT NO. : 5,339,194

DATED : Aug. 16, 1994

INVENTOR(S) : Robert Yates

It is certified that error appears in the above-identified patent and that said Letters Patent is hereby corrected as shown below:

```
Column 4, line 61, change "barre" to -- barrel--
Column 5, line 44, change "springs" to --spacings--
Column 6, line 26, change "id" to --is--
```

Signed and Sealed this

Twenty-second Day of November, 1994

Attest:

BRUCE LEHMAN

Attesting Officer

Commissioner of Patents and Trademarks